United States Patent
Whynot et al.

(10) Patent No.: US 6,963,352 B2
(45) Date of Patent: Nov. 8, 2005

(54) APPARATUS, METHOD, AND COMPUTER PROGRAM FOR SUPPORTING VIDEO CONFERENCING IN A COMMUNICATION SYSTEM

(75) Inventors: Stephen R. Whynot, Richardson, TX (US); Gregory T. Stovall, Omaha, AK (US); David W. McKnight, Garland, TX (US)

(73) Assignee: Nortel Networks Limited, St. Laurent (CA)

(*) Notice: Subject to any disclaimer, the term of this patent is extended or adjusted under 35 U.S.C. 154(b) by 89 days.

(21) Appl. No.: 10/610,509

(22) Filed: Jun. 30, 2003

(65) Prior Publication Data

US 2004/0263610 A1 Dec. 30, 2004

(51) Int. Cl.[7] .................................................. H04N 7/14
(52) U.S. Cl. ........................ 348/14.08; 348/14.09; 348/14.12; 379/202.01
(58) Field of Search ................... 348/14.01–14.09, 348/14.1, 14.11, 14.12, 14.13; 370/260, 261; 709/204; 345/753; 329/202.01

(56) References Cited

U.S. PATENT DOCUMENTS

| | | | |
|---|---|---|---|
| 5,619,555 A | 4/1997 | Fenton et al. | |
| 5,710,591 A | 1/1998 | Bruno et al. | |
| 5,812,653 A | 9/1998 | Jodoin et al. | |
| 5,889,945 A | 3/1999 | Porter et al. | |
| 6,125,115 A | 9/2000 | Smits | |
| 6,185,565 B1 | 2/2001 | Meubus et al. | |
| 6,279,039 B1 | 8/2001 | Bhat et al. | |

FOREIGN PATENT DOCUMENTS

| | | | | |
|---|---|---|---|---|
| JP | 404063084 A | * | 2/1992 | ............ H04N/7/15 |
| JP | 08-130723 | * | 5/1996 | ............ H04N/7/15 |
| WO | WO 01/65390 A1 | | 9/2001 | |
| WO | WO 03/051027 A1 | | 6/2003 | |

OTHER PUBLICATIONS

Kumar et al., "IP Telephony with H.323, Architecture for Unified Networks and Integrated Services", Apr. 1, 2001, pp. 134–142, pp. 290–298.

* cited by examiner

*Primary Examiner*—Melur Ramakrishnaiah
(74) *Attorney, Agent, or Firm*—John D. Crane

(57) ABSTRACT

A call conferencing apparatus, method, and computer program switch the video information presented to one or more participants during a conference call. The apparatus, method, and computer program identify a primary speaker channel during a video conference. Video information from the primary speaker channel is then provided to at least one other channel of the communication session.

20 Claims, 2 Drawing Sheets

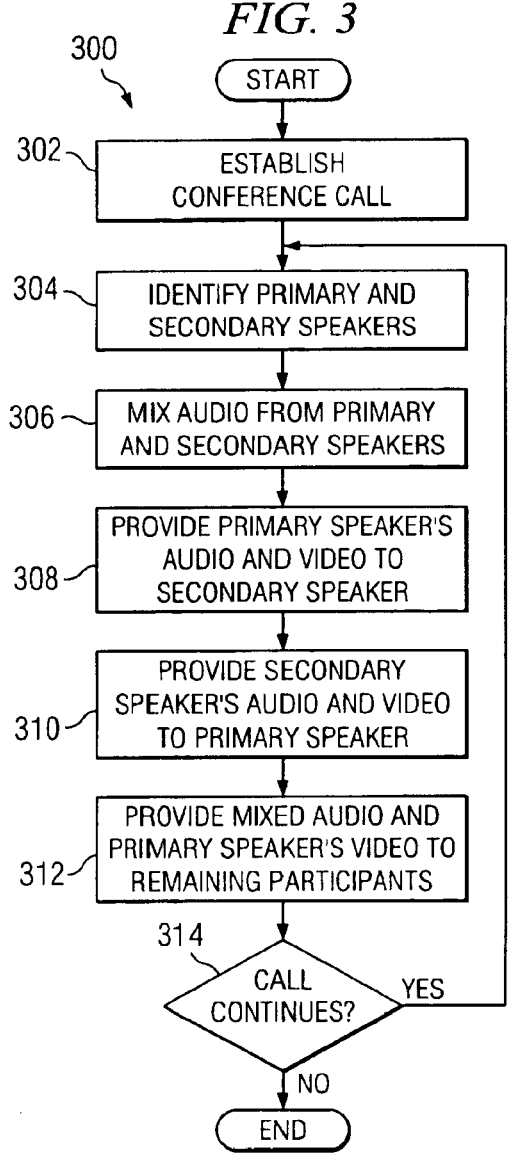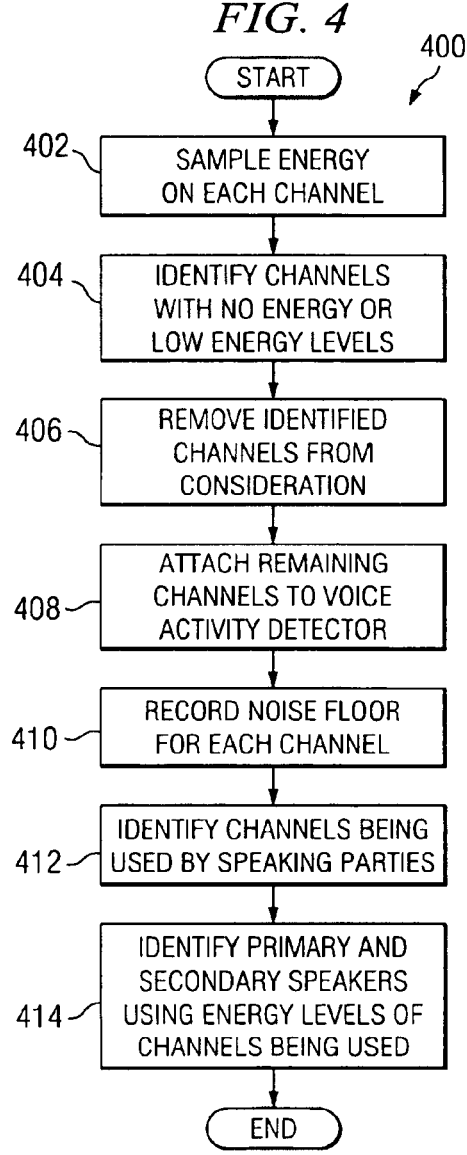

APPARATUS, METHOD, AND COMPUTER PROGRAM FOR SUPPORTING VIDEO CONFERENCING IN A COMMUNICATION SYSTEM

CROSS REFERENCE TO RELATED APPLICATIONS

This application is related to:

U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated herein by reference;

U.S. patent application Ser. No. 10/610,373 entitled "APPARATUS, METHOD, AND COMPUTER PROGRAM FOR MANAGING RESOURCES IN A COMMUNICATION SYSTEM," filed on Jun. 30, 2003, and which is incorporated herein by reference; and U.S. patent application Ser. No. 10/610,508 entitled "APPARATUS, METHOD, AND COMPUTER PROGRAM FOR PROCESSING AUDIO INFORMATION IN A COMMUNICATION SYSTEM," filed on Jun. 30, 2003, and which is incorporated herein by reference.

TECHNICAL FIELD

This disclosure relates generally to communication systems and more specifically to an apparatus, method, and computer program for supporting video conferencing in a communication system.

BACKGROUND

Video conferencing systems are becoming more popular in the United States and around the world. In a conventional video conferencing system, one party communicates audio signals and video images to another party (often through a multipoint conferencing server or other unit) and receives audio signals and video images from the other party (indirectly through the server). A problem with conventional video conferencing systems is that the video conferences often consume large amounts of the systems' resources. Also, desktop video phones and mobile communication devices typically have much smaller screens than conventional computers. This often makes it difficult to display video images from many parties during the video conference.

SUMMARY

This disclosure provides an apparatus, method, and computer program for supporting video conferencing in a communication system.

In one aspect, a method for video conferencing includes receiving through at least one port at least one channel of a plurality of channels for a communication session. The at least one channel has audio and video information from at least two of a plurality of video conference participants. The method also includes identifying a channel of the plurality of channels as a primary speaker channel from at least some of the audio information of the plurality of channels. In addition, the method includes providing the video information from the primary speaker channel to the communication session.

In a particular aspect, the method also includes identifying a channel of the plurality of channels as a secondary speaker channel. The method further includes providing the audio and video information from the primary speaker channel to the secondary speaker channel and providing the audio and video information from the secondary speaker channel to the primary speaker channel. Providing the video information from the primary speaker channel to the communication session includes providing the audio information from both the primary and secondary speaker channels and the video information from the primary speaker channel to at least one other channel of the communication session.

In another particular aspect, the primary speaker channel is identified by ignoring any channel whose associated audio information has an energy level below a threshold level. A noise floor for each channel whose associated audio information has an energy level above the threshold level is determined. Using the noise floor, the channels associated with participants who are speaking are identified, and the primary speaker channel represents one of the channels associated with a speaking participant.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings in which:

FIG. 3 illustrates an example method for supporting video conferencing in a communication system according to one embodiment of this disclosure; and FIG. 4 illustrates an example method for identifying primary and secondary speakers during a video conference according to one embodiment of this disclosure.

DETAILED DESCRIPTION

Figure 1:
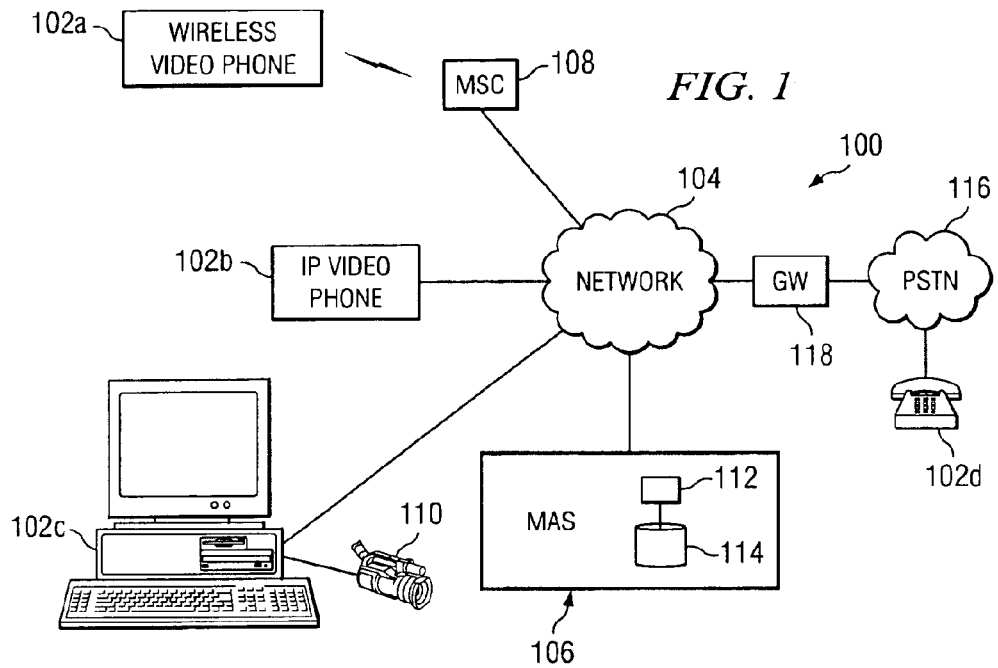
FIG. 1 illustrates an example video conferencing system according to one embodiment of this disclosure.

FIG. 1 illustrates an example video conferencing system 100 according to one embodiment of this disclosure. The system 100 shown in FIG. 1 is for illustration only. Other embodiments of the system 100 may be used without departing from the scope of this disclosure.

In the illustrated example, the system 100 includes one or more video clients 102a–102c, a network 104, and a media application server ("MAS") 106.

The video clients 102a–102c represent devices used by users or subscribers during video conferences, or data conversions or conversations between devices or applications over a network that involve video information. For example, each video client 102 represents an input/output device that could include a microphone and a speaker to capture and play audio information. A video client 102 could also include a camera and a display to capture and play video information.

During a video conference, the video clients 102 communicate with the MAS 106 over the network 104. As an example, the video clients 102 may transmit audio and video information to the MAS 106 and receive audio and video information from the MAS 106. As will be appreciated, each video client 102 may be constructed or configured from any suitable hardware, software, firmware, or combination thereof for transmitting or receiving audio or video information.

The system 100 shown in FIG. 1 illustrates various embodiments of the video clients 102. For example, the video client 102a represents a wireless video phone that communicates with the network 104 through a mobile switching center ("MSC") 108. The video client 102b represents a wired Internet Protocol ("IP") video phone that communicates directly with the network 104. The video client 102c represents a personal computer connected to a web camera 110. This represents three embodiments of the video clients 102, and other or additional video clients 102 may be utilized in the system 100 of FIG. 1. By way of illustration in FIG. 1, each of the video clients 102a–102c is different. It will be understood, however, that the video clients 102 in the system 100 may include or represent the same or similar type of device or other combination of video clients.

The network 104 is coupled to the video clients 102, the MAS 106, and the mobile switching center 108. In this document, the term "couple" refers to any direct or indirect communication between two or more components, whether or not those components are in physical contact with each other.

The network 104 facilitates communication between components of the system 100. For example, the network 104 may communicate Internet Packets ("IP"), frame relay frames, Asynchronous Transfer Mode ("ATM") cells, Ethernet, X.25, frame relay, or other suitable information protocols between network addresses or devices. The network 104 may include one or more local area networks ("LANs"), metropolitan area networks ("MANs"), wide area networks ("WANs"), all or portions of a global network such as the Internet, or any other communication system or systems at one or more locations.

Figure 2:
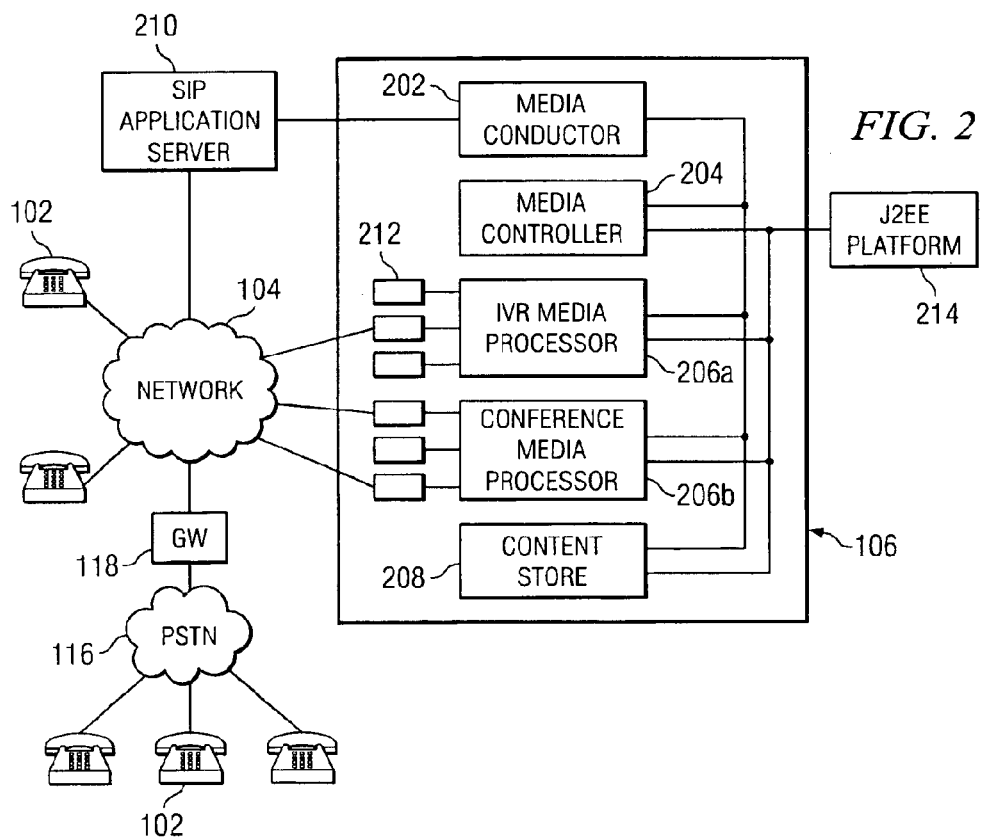
FIG. 2 illustrates an example media application server according to one embodiment of this disclosure.

The media application server ("MAS") 106 is coupled to the network 104. The MAS 106 supports video conferencing sessions between video clients 102 in the system 100. For example, the MAS 106 may receive requests from the video clients 102 to establish or join a video conference. The MAS 106 may also receive audio and video information from one video client 102 and communicate the information to the other video clients 102 involved in a video conference. The MAS 106 may be constructed or configured using any hardware, software, firmware, or combination thereof for supporting video conferencing sessions in the system 100. In the illustrated example, the MAS 106 includes one or more processors 112 that execute instructions and one or more memories 114 that store instructions and data used by the processors 112. Example Media Application Servers 106 are shown in FIG. 2, which is described below, and in co-pending U.S. patent application Ser. No. 10/610,511 entitled "DISTRIBUTED CALL SERVER SUPPORTING COMMUNICATION SESSIONS IN A COMMUNICATION SYSTEM AND METHOD" and filed on the same date herewith, which is incorporated herein by reference. The microprocessor(s) 112 is generally understood to be a device that drives a general-purpose computer. It is noted, however, that other processor devices, such as microcontrollers or ASICs, can be used as well and achieve the benefits and advantages described herein.

Video conferencing sessions established and managed by the MAS 106 can include communication devices other than the video clients 102a–102c. For example, a video or other client 102d may be connected to a public telephone network, such as a public switched telephone network ("PSTN") 116. The PSTN 116 and the network 104 may use different protocols to communicate. To facilitate communication between the networks, a gateway 118 is coupled to the network 104 and the PSTN 116. The gateway 118 translates between the different protocols used by the network 104 and the PSTN 116.

The video clients 102 and the MAS 106 could support suitable standards or protocols used to set up, maintain, and terminate communication sessions between end users. As examples, the video clients 102 and the MAS 106 could communicate audio, video, or other information in the Realtime Transfer Protocol ("RTP") over User Datagram Protocol ("UDP") and the International Telecommunication Union-Telecommunications ("ITU-T") H.263 standard (video CODECs) and other standards or protocols such as the G.711 and G.729 audio CODEC standards. Other CODECs, such as Moving Picture Experts Group-4 ("MPEG-4"), Digital Video Express ("DIVX"), and Windows Media Video ("WMV"), can be supported by the MAS 106. In addition, signaling messages sent between the video clients 102 and the MAS 106 may include or conform with the Session Initiation Protocol ("SIP"), which is an application layer protocol for the establishment, modification, and termination of conferencing and telephony sessions over an IP-based networks. As will be appreciated, additional protocols and configurations may be used.

In one aspect of operation, the MAS 106 controls which audio and video information is sent to each video client 102 involved in a video conference. For example, the MAS 106 includes program logic that identifies a primary speaker and/or a secondary speaker in the video conference. The primary speaker may be associated with a "primary speaker channel" over which audio and video information from the primary speaker is received. Similarly, the secondary speaker may be associated with a "secondary speaker channel" over which audio and video information from the secondary speaker is received. The MAS 106 provides the audio and video information from the secondary speaker to the primary speaker's video client 102. The MAS 106 also provides the audio and video information from the primary speaker to the secondary speaker's video client 102. In addition, the remaining video clients 102 (if more than two are involved) receive the video information from the primary speaker and a mix of the audio information from the primary and secondary speakers.

In some embodiments, the identification of the primary and secondary speakers by the MAS 106 represents an iterative process. For example, the MAS 106 may identify the primary and secondary speakers at specified intervals during the video conference. The MAS 106 may also execute a hysteresis function, which limits how often the MAS 106 identifies a different primary or secondary speaker during a video conference. A change to the primary or secondary speaker results in a change to the image displayed on one or more of the video clients 102. Rapid changes in the identity of the primary or secondary speaker cause a rapid succession of different images to be displayed to participants in the conference, which may be distracting. The use of the hysteresis function may help to reduce the likelihood that the MAS 106 would quickly and repeatedly identify different primary or secondary speakers. In this document, the term "participant" refers to a user of a video or other client who joins a video conference, whether or not the user is actively speaking or performing another action during the conference.

In some embodiments, by identifying the primary and secondary speakers, each participant in a video conference may receive video information from only one other participant. In this way, the MAS 106 can reduce the resources needed during the video conference. As an example, the MAS 106 need not ensure that each participant receives video information from all other participants in the video conference. Also, video clients 102 with small displays can display the video information from a single participant, rather than requiring the display to show small or "thumbnail" images from multiple participants.

Although FIG. 1 illustrates one example of a video conferencing system 100, various changes may be made to FIG. 1. For example, varying video clients 102, networks 104, and servers 106 could be used in the system 100. Also, while FIG. 1 shows a PSTN 116 coupled to the network 104, any other or additional network or networks could be coupled directly or indirectly to the network 104. Further, the video conferencing functionality described as being implemented on a MAS 106 may be implemented on any other computing device, such as a desktop computer or a laptop computer.

FIG. 2 illustrates the Media Application Server 106 according to one embodiment of this disclosure. The MAS 106 illustrated in FIG. 2 is for illustration only. Other embodiments of the MAS 106 could be used without departing from the scope of this disclosure. Also, while FIG. 2 illustrates the MAS 106 operating in the system 100 of FIG. 1, the MAS 106 may operate in other suitable systems.

In the illustrated example, the MAS 106 includes a media conductor 202, a media controller 204, two media processors ("MPs") 206a–206b, and a content store 208. The media conductor 202 processes signaling messages received by the MAS 106. In some embodiments, the video clients 102 communicate the signaling messages directly (or via a gateway, which serves as an entrance/exit into a communications network) to the MAS 106. In other embodiments, the video clients 102 communicate signaling messages indirectly to the MAS 106, such as when a Session Initiation Protocol ("SIP") application server 210 (that received a request from a video client 102) sends the signaling messages to the media conductor 202 on behalf of the video client 102. The video clients 102 may communicate directly with the SIP application server 210 or indirectly through a gateway, such as gateway 118. The conductor 202 processes the signaling messages and communicates the processed messages to the media controller 204. As particular examples, the conductor 202 may implement SIP call control, parameter encoding, and media event package functionality.

The media controller 204 manages the operation of the MAS 106 to provide services to the video clients 102. For example, the media controller 204 may receive processed SIP requests from the conductor 202, where the requests involve conference or non-conference calls. The controller 204 may then select the media processor 206 to handle each of the calls, support audio/video capability negotiations, enforce licenses controlling how the MAS 106 can be used, and control negotiations based on the licenses. The negotiations could include identifying the CODEC to be used to encode and decode audio or video information during a call.

The media processors 206a–206b handle the exchange of audio or video information between clients 102 involved in a conference or non-conference call. For example, a media processor 206 could receive audio and video information from one client 102 involved in a call, process the information as needed, and forward the information to at least one other client 102 involved in the call. The audio and video information may be received through one or more ports 212, which couple the media processors 206 to the network 104. The ports 212 may represent any suitable structure operable to facilitate communication between the MAS 106 and the network 104. The term "processor" as used with respect to the media processor 206, means a software application for specific media processing, such as IVR media or conference media, which is executed on the MAS 106 hardware platform via the operating system.

In this example embodiment, each media processor 206 provides different functionality in the MAS 106. For example, in some embodiments, the media processor 206a provides interactive voice response ("IVR") functionality in the MAS 106. As particular examples, the media processor 206a supports a voice mail function that can record and play messages or an auto-attendant function that provides a menu and directs callers to particular destinations based on their selections. The media processor 206b provides conferencing functionality in the MAS 106, such as by facilitating the exchange of audio and video information between video clients 102.

The content store 208 provides access to content used by the various components of the system 100. For example, in some embodiments, the content store 208 provides access to stored voice mail messages and access codes used to initiate or join conference calls. The content store 208 also provides access to any other or additional information. In other embodiments, the content store 208 is replaced by a conventional database or other data storage facility.

A Java 2 Enterprise Edition ("J2EE") platform 214 is coupled to the MAS 106. The J2EE platform 214 allows the MAS 106 to retrieve information used to provide subscriber services over the system 100. For example, the J2EE platform 214 may provide audio announcements used by the IVR media processor 206a. The J2EE platform 214 represents one possible apparatus used to provide audio or other information to the MAS 106. Any other or additional device or apparatus may be used to provide the information to the MAS 106.

In a particular embodiment, the various components of the MAS 106 represent software processes executed by the processor 112 of the MAS 106. While the components 202–208 have been described as being executed by a MAS 106, the software processes could be executed by other computing devices such as a desktop computer.

In the illustrated example, the conference media processor 206b implements the video conferencing functionality described above. For example, the conductor 202 receives signaling messages indicating that two or more video clients 102 wish to engage in a video conference. The controller 204 receives the requests and causes the conference media processor 206b to establish the video conference. The conference media processor 206b then receives audio and video information from each video client 102 and forwards the information to the other video clients 102. The conference media processor 206b also identifies the primary and/or secondary speakers and routes the appropriate audio and video information to the video clients 102.

Although FIG. 2 illustrates one example of a Media Application Server 106, various changes may be made to FIG. 2 while maintaining the advantages and functionality recited herein. For example, any number of media processors 206a, 206b could be used in the MAS 106. Also, the functional divisions shown in FIG. 2 are for illustration only. Various components can be combined or omitted or additional components can be added according to particular functional designations or needs. In addition, while the components 202–208 have been described as being executed by a MAS 106, the components 202–208 may be executed by other hardware platforms, for example, such as a desktop computer.

FIG. 3 illustrates an example method 300 for supporting video conferencing in a communication system according to one embodiment of this disclosure. For clarity, the method 300 may be described with respect to the MAS 106 of FIG. 2 operating in the system 100 of FIG. 1. The method 300 could also be used by other suitable devices or in other video conferencing systems.

The MAS 106 establishes a conference call at step 302. This may include, for example, the MAS 106 receiving requests from the video clients 102. This may also include the media conductor 202 in the MAS 106 processing and forwarding the requests to the media controller 204. This may further include the media controller 204 causing the conferencing media processor 206b to establish a conference call for the video clients 102.

The MAS 106 identifies primary and/or secondary speakers involved in the video conference at step 304. This may include, for example, the media processor 206b using the method shown in FIG. 4 and described below to identify the primary and secondary speakers.

The MAS 106 mixes the audio information from the primary and secondary speakers at step 306. This may include, for example, the media processor 206b combining the audio information from the primary and secondary speakers into a single audio stream.

The MAS 106 provides the primary speaker's audio and video information to the secondary speaker at step 308. The MAS 106 provides the secondary speaker's audio and video information to the primary speaker at step 310. This may include, for example, the media processor 206b communicating the appropriate audio and video information to the primary and secondary speakers' video clients 102.

The MAS 106 provides the mixed audio information from both the primary and secondary speakers and the primary speaker's video information to any remaining participants at step 312. This may include, for example, the media processor 206b providing the mixed audio and video information to video clients 102 associated with participants who are not the primary and secondary speakers.

The MAS 106 determines whether the conference call continues at step 314. If so, the MAS 106 returns to step 304 to identify the primary and secondary speakers again. Otherwise, the method 300 ends. In some embodiments, the MAS 106 identifies primary and secondary speakers at regular intervals, such as every 10 ms or every 750 ms. In other embodiments, the MAS 106 identifies primary and secondary speakers at varying intervals depending on how long the current primary speaker speaks. For example, if the current primary speaker is speaking for a long time, the MAS 106 may take longer to attempt to identify a new primary speaker, such as 750 ms. If the current primary speaker speaks for a short time, it may take a shorter time to attempt to identify a new primary speaker, such as 10 ms.

The creation of the mixed audio at step 306 and providing the primary and secondary speakers' audio information to each other at steps 308–310 may occur in different ways based on the CODECs used by the video clients 102. For example, in some embodiments, the primary and secondary speakers' video clients 102 may use the same audio CODEC to compress audio information. In these embodiments, the primary and secondary speakers could exchange audio information at steps 308–310 without requiring the MAS 106 to decompress the audio information. In other embodiments, the primary and secondary speakers' video clients 102 use different audio CODECs that compress audio information with different compression techniques or standards. In these embodiments, to send audio information from one video client 102 to the other video client 102, the MAS 106 decompresses or decodes the audio information using one CODEC and recompresses or recodes the audio information using the other CODEC.

As another example, in some embodiments, the mixed audio information generated at step 306 could be generated using a single CODEC or using different CODECs. For example, the remaining video clients 102 that receive the mixed audio information at step 312 could all use the same audio CODEC. In these embodiments, the mixed audio information can be generated using a single CODEC, and the mixed audio information is sent to all of the remaining video clients 102. If the remaining video clients 102 use different audio CODECs, multiple copies of the mixed audio information may be produced, and each copy may be compressed or coded using the different audio CODECs.

Although FIG. 3 illustrates one example of a method 300 for supporting video conferencing in a communication system, various changes could be made to FIG. 3. For example, the mixed audio information could be produced after the audio and video information has been sent to the primary and secondary speakers.

FIG. 4 illustrates an example method 400 for identifying primary and secondary speakers during a video conference according to one embodiment of this disclosure. For clarity, the method 400 may be described with respect to the MAS 106 of FIG. 2 operating in the system 100 of FIG. 1. The method 400 could also be used by other suitable devices or in other video conferencing systems.

The MAS 106 samples the energy of the audio information being received on each channel during a video conference at step 402. For example, each video client 102 may communicate audio and video information to the MAS 106 over separate channels, and the media processor 206b samples the energy of the audio signals received over those channels. The media processor 206b could use any suitable technique known to those skilled in the art for measuring the energy level of audio signals received by the MAS 106.

The MAS 106 identifies any channels with low or no energy at step 404. For example, the media processor 206b determines whether the measured energy levels exceed a threshold value. In some embodiments, the audio information received by the MAS 106 over a channel is compressed using a CODEC. In particular embodiments, the MAS 106 determines whether the audio information received over the channel has low or no energy without decompressing the audio information. This may be achieved, for example, using the ITU-T G.729AB silence detection or the Internet Engineering Task Force ("IETF") Request For Comment ("RFC") 3389 silence suppression.

The MAS 106 removes the identified channels having low or no energy at step 406. This may include, for example, the media processor 206b removing the channels having no or low energy levels. The media processor 206b need not consider these removed channels in identifying the primary and secondary speakers involved in a video conference.

The MAS 106 attaches one or more voice activity detectors to the remaining channels at step 408. This may include, for example, the media processor 206b attaching a voice activity detector to each of the remaining channels. As a particular example, the voice activity detectors may represent software processes that attempt to detect voices in incoming audio information.

The MAS 106 records or identifies a noise floor for each of the channels at step 410. The noise floor for a particular channel represents the average noise present in the incoming audio information. As a particular example, a user of a video client 102 could be riding in a car, and the engine noise could be recorded by the video client 102 and communicated to the MAS 106. This engine noise represents noise that need not be provided to other participants in a communication session. In some embodiments, the noise floor is identified by sampling a participant's channel at different times. In particular embodiments, the participant's channel is sampled both when the participant is speaking and when the participant is not speaking so that the voice detector may determine what constitutes noise.

The MAS 106 identifies any channel being used by a speaking party at step 412. This may include, for example, the media processor 206b determining whether the energy level of a channel exceeds the noise floor for that channel. In this case, the excessive energy may represent the voice of the user who is using a video client 102.

The MAS 106 identifies the primary and secondary speakers using the energy levels of the channels being used by speaking parties at step 414. This may include, for example, the media processor 206b identifying the channel having the highest energy level and associating that channel with the primary speaker. This may also include the media processor 206b identifying the channel having the second highest energy level and associating that channel with the secondary speaker. If two channels have equal energy levels, the MAS 106 could take any suitable action, such as randomly selecting one party as the primary speaker or identifying the participant who has been speaking more and choose that participant over another with an equal energy level. Also, if all other channels other than the primary speaker's channel have equal energy levels, the MAS 106 could take any suitable action, such as selecting a random party as the secondary speaker or using the last known secondary speaker until a new secondary speaker is identified.

Although FIG. 4 illustrates one example of a method 400 for identifying primary and secondary speakers during a video conference, various changes may be made to FIG. 4. For example, the MAS 106 could skip steps 404–406 and process all of the channels. Also, another other or additional technique could be used to identify the primary or secondary speakers. As an example, a particular user could be assigned as the primary speaker.

The Media Application Server 106 described above may provide various technical features or advantages over previous systems. For example, the MAS 106 may more efficiently process and provide video information to participants in a video conference. In particular, each participant may receive video information from one other participant, which reduces the amount of video information received by each participant and reduces the amount of bandwidth needed for the video conference. Also, the MAS 106 may more efficiently process and provide audio information to participants in a video conference. For example, the MAS 106 may identify and ignore any audio information received from participants identified as being silent and exclude those participants from consideration when identifying the primary and secondary speakers.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for video conferencing, comprising:

receiving a plurality of channels for a communication session, the plurality of channels having audio and video information from a plurality of video conference participants;

identifying a channel of the plurality of channels as a primary speaker channel by:
 ignoring each channel whose associated audio information has an energy level below a threshold level;
 identifying a noise floor for each channel whose associated audio information has an energy level above the threshold level; and
 for each channel whose associated audio information has an energy level above the threshold level, using the noise floor for the channel to determine whether the participant associated with the channel is speaking, the primary speaker channel representing a channel associated with a speaking participant;

providing the video information from the primary speaker channel to the communication session.

2. The method of claim 1, wherein:

identifying the primary speaker channel comprises identifying different primary speaker channels at different times during the communication session; and providing the video information from the primary speaker channel to the communication session comprises switching the video information provided to the communication session based on a change to the identified primary speaker channel.

3. The method of claim 1, further comprising:

identifying a channel of the plurality of channels as a secondary speaker channel;

providing the audio and video information from the primary speaker channel to the secondary speaker channel; and providing the audio and video information from the secondary speaker channel to the primary speaker channel;

wherein providing the video information from the primary speaker channel to the communication session comprises providing the audio information from both the primary and secondary speaker channels and the video information from the primary speaker channel to at least one other channel of the communication session.

4. The method of claim 3, wherein:

identifying the primary speaker channel comprises identifying the channel associated with the audio information having a first energy level; and identifying the secondary speaker channel comprises identifying the channel associated with the audio information having a second energy level, wherein the first energy level is greater than the second energy level.

5. The method of claim 3, wherein providing the audio information from both the primary and secondary speaker channels to at least one other channel comprises:
- mixing the audio information from the primary and secondary speaker channels; and
- providing the mixed audio information to the at least one other channel.

6. The method of claim 5, wherein mixing the audio information comprises:
- identifying one or more audio CODECs used by the at least one other channel; and
- compressing the mixed audio information at least one time, once for each of the one or more identified CODECs.

7. An apparatus for video conferencing, comprising:
- one or more ports operable to receive a plurality of channels for a communication session, the channels having audio and video information from a plurality of conference communication session participants; and
- one or more processors collectively operable to:
  - identify a channel of the plurality of channels as a primary speaker channel by:
    - ignoring each channel whose associated audio information has an energy level below a threshold level;
    - identifying a noise floor for each channel whose associated audio information has an energy level above the threshold level; and
    - for each channel whose associated audio information has an energy level above the threshold level, using the noise floor for the channel to determine whether the participant associated with the channel is speaking, the primary speaker channel representing a channel associated with a speaking participant; and
  - provide the video information from the primary speaker channel to the communication session.

8. The apparatus of claim 7, wherein:
- the one or more processors are collectively operable to identify different primary speaker channels at different times during the communication session; and
- the one or more processors are collectively operable to switch the video information provided to the communication session based on a change to the identified primary speaker channel.

9. The apparatus of claim 7, wherein the one or more processors are further collectively operable to:
- identify a channel of the plurality of channels as a secondary speaker channel;
- provide the audio and video information from the primary speaker channel to the secondary speaker channel; and
- provide the audio and video information from the secondary speaker channel to the primary speaker channel;
- wherein the one or more processors are collectively operable to provide the video information from the primary speaker channel to the communication session by providing the audio information from both the primary and secondary speaker channels and the video information from the primary speaker channel to at least other channel of the communication session.

10. The apparatus of claim 9, wherein:
- the one or more processors are collectively operable to identify the primary speaker channel by identifying the channel associated with the audio information having a first energy level; and
- the one or more processors are collectively operable to identify the secondary speaker channel by identifying the channel associated with the audio information having a second energy level, wherein the first energy level is greater than the second energy level.

11. The apparatus of claim 9, wherein the one or more processors are collectively operable to provide the audio information from both the primary and secondary channels to the at least one other channel by:
- mixing the audio information from the primary and secondary speaker channels; and
- providing the mixed audio information to the at least one other channel.

12. The apparatus of claim 11, wherein the one or more processors are collectively operable to mix the audio information by:
- identifying one or more audio CODECs used by the at least one other channel; and
- compressing the mixed audio information at least one time, once for each of the one or more identified CODECs.

13. A computer program embodied on a computer readable medium and operable to be executed by a processor, the computer program comprising computer readable program code for:
- receiving a plurality of channels for a communication session, the plurality of channels having audio and video information from a plurality of video conference participants;
- identifying a channel of the plurality of channels as a primary speaker channel by:
  - ignoring each channel whose associated audio information has an energy level below a threshold level;
  - identifying a noise floor for each channel whose associated audio information has an energy level above the threshold level; and
  - for each channel whose associated audio information has an energy level above the threshold level, using the noise floor for the channel to determine whether the participant associated with the channel is speaking, the primary speaker channel representing a channel associated with a speaking participant; and
- providing the video information from the primary speaker channel to the communication session.

14. The computer program of claim 13, wherein:
- the computer readable program code for identifying the primary speaker channel identifies different primary speaker channels at different times during the communication session; and
- the computer readable program code for providing the video information from the primary speaker channel to the communication session switches the video information provided to the communication session based on a change to the identified primary speaker channel.

15. The computer program of claim 13, wherein the computer program further comprises computer readable program code for:
- identifying a channel of the plurality of channels as a secondary speaker channel;
- providing the audio and video information from the primary speaker channel to the secondary speaker channel; and
- providing the audio and video information from the secondary speaker channel to the primary speaker channel;

wherein the computer readable program code for providing the video information from the primary speaker channel to the communication session comprises the computer readable program code for providing the audio information from both the primary and secondary speaker channels and the video information from the primary speaker channel to at least one other channel of the communication session.

16. The computer program of claim 15, wherein:

the computer readable program code for identifying the primary speaker channel comprises computer readable program code for identifying the channel associated with the audio information having a first energy level; and the computer readable program code for identifying the secondary speaker channel comprises computer readable program code for identifying the channel associated with the audio information having a second energy level, wherein the first energy level is greater than the second energy level.

17. The computer program of claim 15, wherein the computer readable program code for providing the audio information from both the primary and secondary speaker channels to the at least one other channel comprises computer readable program code for:

mixing the audio information from the primary and secondary speaker channels;

identifying one or more audio CODECs used by the at least one other channel;

compressing the mixed audio information at least one time, once for each of the one or more identified CODECs; and providing the compressed audio information to the at least one other channel.

18. A method for video conferencing, comprising:

receiving audio and video information from a plurality of sources including a first source and a second source;

selecting the video information from one of the sources by:

ignoring each source whose associated audio information has an energy level below a threshold level;

identifying a noise floor for each source whose associated audio information has an energy level above the threshold level; and identifying each source whose associated audio information has an energy level above the noise floor for that source, the selected video information associated with a source whose associated audio information has an energy level above the noise floor for that source; and sending the selected video information to a destination.

19. The method of claim 18, wherein selecting the video information from one of the sources comprises identifying the audio information having a highest energy level, wherein the selected video information comprises the video information associated with the audio information having the highest energy level.

20. The method of claim 18, wherein the selected video information comprises the video information from the first source; and further comprising:

sending the selected video information to the second source;

sending the video information from the second source to the first source;

sending the audio information from the first source to the second source;

sending the audio information from the second source to the first source; and sending a mix of the audio information from the first and second sources to the destination.

* * * * *